May 15, 1928. 1,670,138
F. B. COCKBURN
AIR OPERATED CHUCK FOR LATHES
Filed May 8, 1925  2 Sheets-Sheet 1
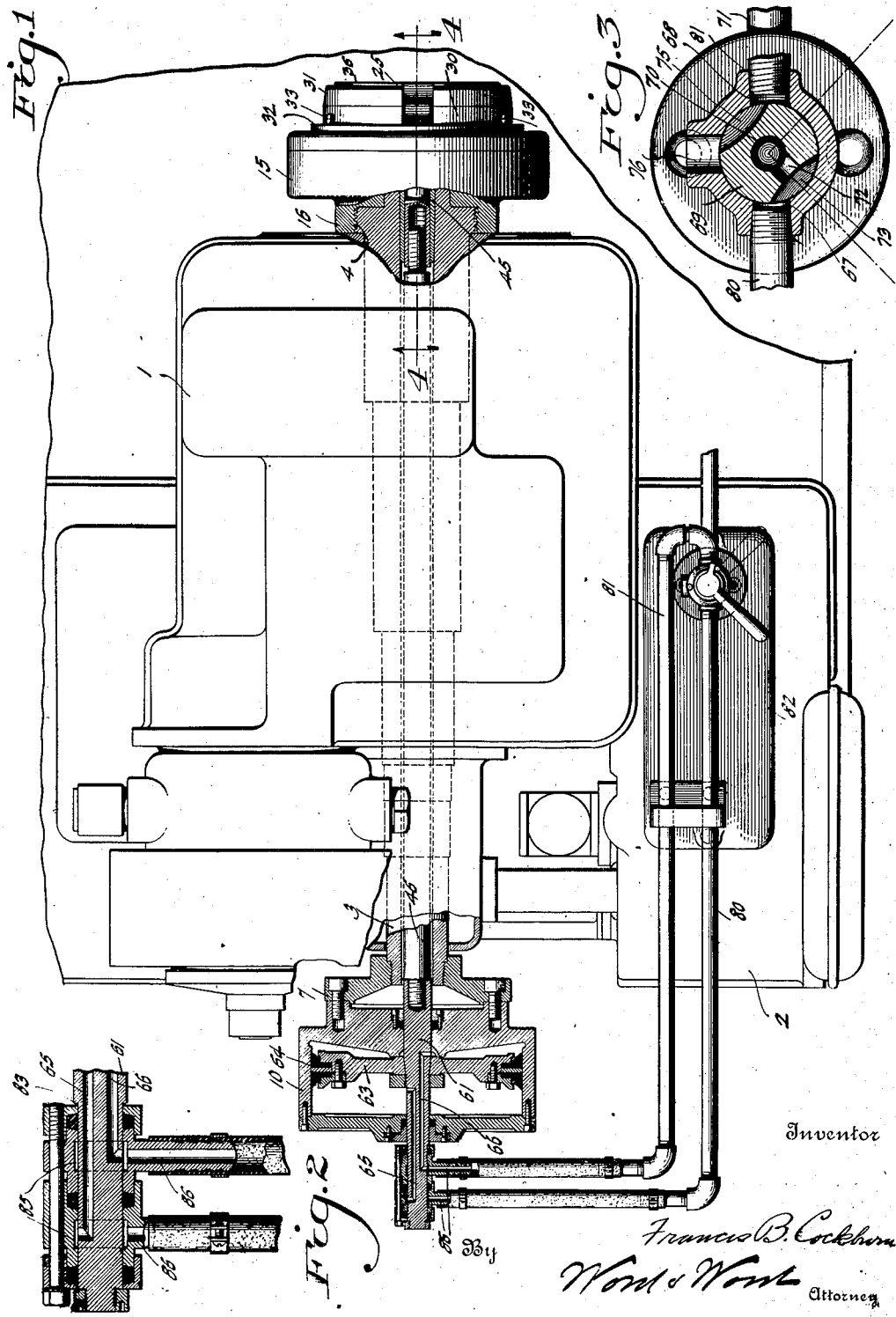

May 15, 1928.  
F. B. COCKBURN  
AIR OPERATED CHUCK FOR LATHES  
Filed May 8, 1925  
1,670,138  
2 Sheets-Sheet 2
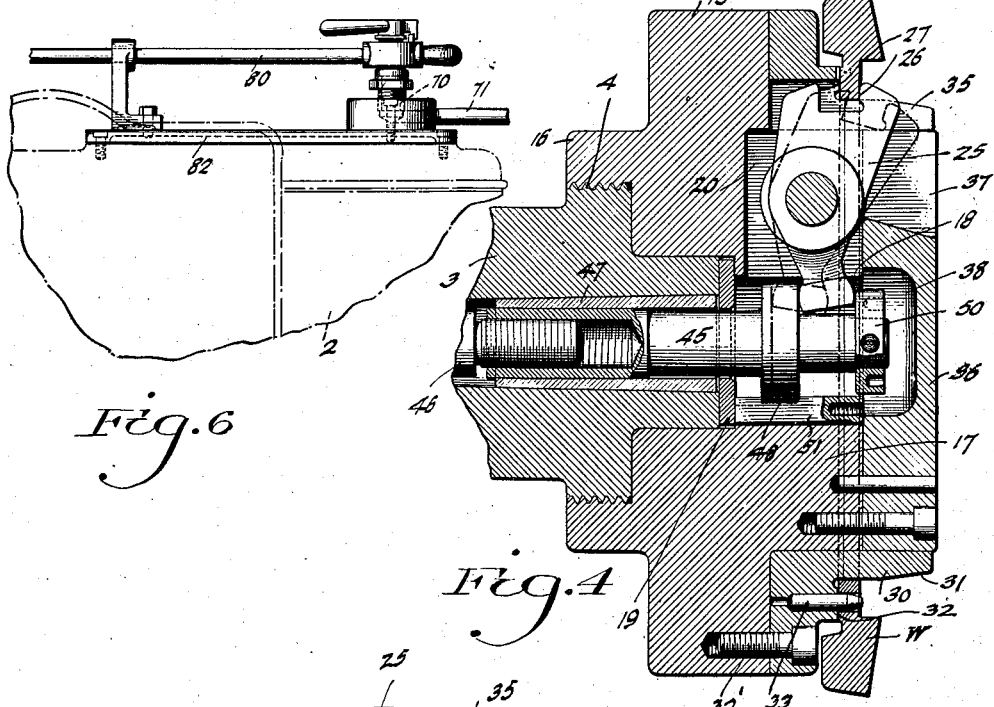
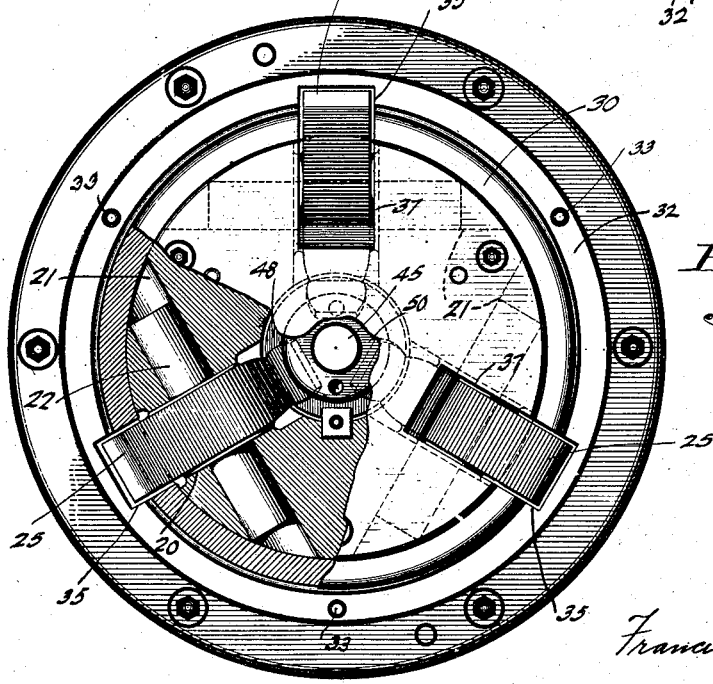
Inventor  
Francis B. Cockburn  
By Wood & Wood  
Attorneys Patented May 15, 1928.

1,670,138

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

AIR-OPERATED CHUCK FOR LATHES.

Application filed May 8, 1925. Serial No. 28,935.

This invention relates to work-securing devices, and is generally applicable to lathes, wherein the work is held upon and rotated by a spindle.

The construction, selected for purposes of illustration, is adapted for securing automobile ring gears to the spindle of a metal turning lathe.

In facing or cutting work of this character, rigidity of structure is most necessary inasmuch as the operation is performed rapidly.

An object of the invention is to provide a work holder and clamping means attachable as a unit to the lathe spindle, to accurately center and securely hold the work and to provide for quickly applying and removing work from the spindle.

Another object is to provide a work-securing device having work clamping members operable in unchucking the work to translate or eject the work to assist in its removal.

Another object is to provide fluid pressure means for operating the chuck or clamping members, controllable from any convenient and accessible station to the operator.

Other objects and certain advantages will be more fully set forth in the description of the accompanying drawings forming a part of this specification, in which:

Figure 1 is a plan view of the headstock end of a lathe, certain parts being broken away, to show the manner of mounting my invention as well as to show the structure of certain portions of the same.

Figure 2 is a detail longitudinal section of the outer portion of the piston rod illustrating the manner of connecting the fluid pressure delivery conduits therewith.

Figure 3 is a plan section illustrating the control valve.

Figure 4 is an axial section of the clamp head or chuck.

Figure 5 is a front face view of the head, partly in section.

Figure 6 is an elevation illustrating the mounting of the fluid control valve and pipes connected therewith.

The device is shown applied to a metal turning lathe, a fragmentary illustration only of which is made since the lathe structure in detail forms no part of the present invention. A sufficient portion is shown, however, to illustrate the rotatably mounted spindle, which may be that of any turning machine. The headstock is indicated at 1 and the gear box at 2. Rotatably mounted in the headstock in any preferred manner is a tubular spindle 3 projecting beyond the headstock casing at both ends. The spindle herein is of double nose type and has the usual threads 4 at its forward end for ordinarily receiving and securing a face plate or chuck. The opposite end of the spindle is counterturned and threaded, and engaged with these threads is a coupling member 7, as a flange, connected by screws to the end of a cylinder or chamber 10 which is disposed at the rear and outside of the headstock casing, for rotation with the spindle.

The work supporting, centering and clamping means as a unit is secured to the face plate threads and is adapted for quick attachment or removal, and in addition provides for securely holding the work during turning and for loosening and translating the work for removal.

This chuck or head comprises a cylindrical body portion 15 having axial cylindrical extensions 16, 17, projecting from opposite sides, both of relatively large diameter, one for supporting and centering the work and the second as a work carrying sleeve or annulus. The head is bored and twice counterbored axially to provide a front passage or chamber 18 within which the head end of a sectional reciprocable clamping jaw operating rod is adapted to operate.

An intermediate socket is also formed to receive the counterturned end or nose of the spindle, and a third or outermost socket is threaded for engagement with the face plate threads of the spindle. Shoulders are formed between the bores, against the inner of which a retaining washer 19 is seated and thus held by the outer end of the spindle, the outer shoulder being engaged by the face of the face plate receiving enlargement.

The front cylindrical projection 17 and forward portion of the chuck is slotted radially as at 20, the slots three in number and equally spaced, extending inwardly across the face and opening into the bore 18. Pivot receiving bores 21 intersect the slots at right angles, and in each slot is disposed a clamping lever or jaw 25 held upon a pivot 22 suitably held in the openings 21.

Each jaw in this outer end is notched radially and peripherally to provide opposed abutments respectively 26, 27, spaced a greater distance apart than the thickness of the work W at the clamping zone, see Figure 4.

The abutments are adapted to lie at opposite sides of the faces of the work when the same is seated and centered upon the head in clamping position. The pivotal axis 22 of the clamp member 25, abutments 26, 27, outer extremity of the lever, and periphery of the central bore of the work, or, in this instance, of the ring gear, are so related, that when one abutment 26 engages and clamps the work, the other 27, is spaced therefrom and is adapted to act as a work loosening and translating means engageable with the work at the opposite side as the clamping abutment 26 recedes, and after completion of the movement to dispose the outer extremity of the member in such manner as to permit ready removal of the work over the same. It is to be understood that the levers are simultaneously operated all in a similar manner.

Thus, each lever or jaw has at the extremity of its outer arm opposing the spaced slot, walls, as abutments, one for engaging the work at one side and clamping the same, in this instance against a work supporting and centering annulus or sleeve, and the other as a push-off abutment normally lying at and spaced from the opposite side of the work but engageable therewith for loosening and translating the same for removal. The relations of the abutments, pivotal axis of the lever, and periphery of the work supporting member is such that as recession of the holding end of the lever proceeds, the rear shoulder will engage, loosen and translate the work, and at its limit of movement dispose the jaw at a point inside the peripheral plane of the work supporting member for clearance by the work, as the same is manually removed from the chuck. The abutments may be formed in any suitable manner providing that the relation of the parts, as above mentioned, is obtained.

The full release position of the levers is shown in dot-and-dash lines, in Fig. 4, and when in this position the outer extremity of the abutment 26 lies within or inside of the peripheral plane of the work supporting extension of the sleeve 30, and the outer extremity of the abutment 27 is disposed beyond or outside of that plane and of the plane of the annular vertically disposed work-engaging face 32 so that the work will clear the forward portion of the jaw or abutment 26 when engaged over the sleeve and slid to position, and as it approaches the annular face will engage against the shoulder 27. As the jaw is brought to clamping position the outer extremity of the abutment describes a circular path and gradually rises and projects beyond the periphery of the work support, engages the outer face of the work, and translates the same to final or clamped position, which is shown in full lines in Fig. 4. Thus, whenever the jaw swings outwardly to its limit the extremity thereof is so disposed that the work can be freely drawn outwardly and removed from the support.

Over the forward cylindrical extension 18 is preferably placed a work holding and centering device 30, of substantially L-shaped configuration cross-sectionally, providing a forward cylindrical extension tapered circumferentially adjacent its outer end as at 31, to permit facile engagement of the work thereover. The sleeve has a flange traversed by screws 32' which engage with and attach the sleeve to the head, and the flange is provided with removable forwardly projecting pins 33 equally circumferentially spaced, adapted to enter corresponding openings of the work to prevent rotation thereof. The work may, however, be supported directly upon the cylindrical extension in which case the periphery of the extension will be related to the abutments in the same manner that the periphery of the sleeve is related.

The sleeve is radially slotted outwardly from its bore as at 35 these slots being in registration with the corresponding slots 20 of the head for the housing of the clamping levers.

The forward bore 18 as well as the radial jaw receiving slots 20 are closed by a plate 36 correspondingly radially slotted as at 37, for registration with the jaw receiving slots, said plate having a central socket 38 at the inner side adapted for registration with the bore 18 to provide a closed chamber in which the forward section of the operating rod reciprocates. The circular plate forms an extension of the head over which the sleeve 30 also fits. This cover is held from rotation by suitable fastening devices engaged therethrough and connected with the head.

A renewable, removable work supporting and centering device is thus provided upon which the work is adapted to be non-rotatably held with its face engaging a corresponding ring-like face 32 formed by counterturning. In this position the work may be engaged at its outer face by the abutment 26 of each clamp jaw, and its rear face by the opposite abutment 27, as the jaws are released and brought to their forward limits, at which position the work can be removed by passing outwardly over them.

The jaws are simultaneously operable by a single reciprocating rod with which they are constantly engaged, the rod being maintained within the tubular spindle, and splined thereto so as to be rotatable therewith. Power for operating the rod for bringing the jaws to and holding them in clamping position, as well as for releasing and forcibly throwing them to limits of released position, is obtained by means of compressed fluid, the power being applicable while the spindle is in motion.

For the above purpose the sectional clamping lever or jaw operating rod loosely traverses the spindle bore, and this rod comprises a forward lever engaging section 45, and a rear coupling or link section 46 for connecting the section 45 with the piston rod of the compression cylinder. The section 46 is terminally counterturned and the terminal counterturned portions threaded, the forward threads being engaged with the corresponding threaded socket in that portion of the lever engaging section 45 of largest diameter. This portion of the section 45 is slidably engaged in the cylindrical bore of the exteriorly tapered sleeve 47 which is fitted in the corresponding tapered bore portion of the spindle and secured therein by the washer 19 through which the forward reduced portion of the section loosely extends. This forward portion of the section has a circular flange 48 spaced from the forward end and attached in any suitable manner as an abutment, for engaging the inner jaw arm at one side for forcing the lever to and maintaining the same in clamping position.

The section is terminally counterturned and threaded, its threads having engaged therewith the corresponding threads of a ring 50 held non-rotatably by a set screw, and acting as an abutment for engaging the opposite side of the lever arm to forcibly move the same to work release and work push-off positions.

The terminals of all inner arms of the levers are slidably held between the opposing faces of the abutments, the opposite faces of these arms being curved. The section 45 is splined to the chuck body by slotting the flange 48, peripherally, radially and longitudinally, and by similarly slotting the forward bore of the chuck, and inserting a removable key 51 in the registered slots.

In order that the clamping and push-off power may be applied to the jaws while the spindle rotates, a compression fluid operated device, as a cylinder, is attached to and rotates with the spindle, the piston rod of which device is connected with the jaw operating rod or link 46 (see Fig. 1).

The compression cylinder 10 may be of any preferred form or standard make, and is provided with a piston 63 engaged upon a piston rod 61 coupled with the threaded extremity of the rod 46, and is reciprocable axially of the cylinder in suitably packed bearings. The piston carries the usual packing rings 64. The piston rod has two parallel longitudinal bores 65, 66, opening within the cylinder at relatively opposite sides of the head, each connected at its outer end with a pipe line. The pipe lines are respectively connected in diametric relation with conduits 67, 68, of the control valve casing, (see Fig. 3), which casing is mounted upon a suitable base attached to the top of the gear box. The valve may be of any preferred construction but is herein shown as comprising a rotatably journaled stem 69 having an axial bore 70 connected by an intake pipe line 71, with a suitable pressure tank, not shown.

This intake 70 is connected by a radial cross-passage 72 which in turn connects with a passage 73, tangent to the stem axis, adapted to be alternately disposed for communication with the pressure conduits 67, 68. The stem is provided with a corresponding tangent passage 75 for alternately connecting the pressure conduits with the exhaust passage 76.

Pipes 80, 81 are respectively connected with the passages 67, 68, and are supported intermediate their ends upon a bracket attached to the base plate 82 upon which the valve casing is mounted.

In order that the pressure connection may be maintained between the rotating piston rod 61 and the pipes or conduits 80, 81, the outer end of the piston is counterturned to form a shoulder 83 and additionally counterturned at the outer extremity and threaded. Two collars are telescopically fitted together and engaged over the counterturned portion, each bore of each collar having a circumferential groove 85 respectively surrounding and connecting with the passages 65, 66. Each groove communicates with a radial passage 86 extending through an extension at the outside of the collar and a flexible hose section connects the extensions respectively with the ends of the pipes 80, 81. The collars are of gland-like configuration and are suitably packed for obtaining a sealing rotatable fit about the piston rod 61, the collars being held together upon the piston by bolts extending longitudinally thereof, (see Fig. 2). The inner end of one of the assembled collars or glands abuts the shoulder 83, and a nut upon the counterturned threaded portion engages the outer face of the other gland. In this way the glands may remain stationary while the piston 61 rotates and communication between the fluid supply and cylinder can at all times be maintained.

As shown in Fig. 3, fluid is being admitted to the cylinder in a manner to throw the clamping jaws to and hold the same in clamping position. Upon rotation of the valve through an angle of 45° from the position shown, pressure is removed at that side of the piston head and pressure applied to the opposite side to forcibly translate the piston rod, release the jaws and throw the same to full released position.

Although my invention has been shown as applied to a metal turning lathe, the same could be applied to any form of turning machine wherein work of annular configuration is to be faced.

The device provides means whereby the work may be positively held and as positively released and thrown outwardly for removal from its support, as well as means whereby these operations may be performed while the spindle is rotating and controlled from any convenient distant point. The control in this instance is placed in such position that the operator may release or clamp the work when standing so that the cutting operation may be observed. He can, therefore, release and forcibly translate the work for removal, immediately after the cut is finished.

Having described my invention, I claim:

1. A work holding and centering chuck of the nature described, comprising a body member adapted to be secured upon the end of a machine tool spindle and having an annular nose end over which the work is slidably engaged and against an annular shoulder formed on the body at the inner end of the nose, and a plurality of work clamping levers pivoted within the body, each having a notched end for receiving the work and providing opposing work engaging shoulders one for compressively forcing and holding the work against said annular shoulder and the second to move the work in a direction to withdraw it from the nose.

2. A work holding and centering chuck of the nature described, comprising a body member adapted to be secured upon the end of a machine tool spindle and having an annular nose end over which the work is slidably engaged and against an annular shoulder formed on the body at the inner end of the nose, a plurality of work clamping levers pivoted within the body, each having a notched end for receiving the work and providing opposing work engaging shoulders one for compressively forcing and holding the work against said annular shoulder and the second to move the work in a direction to withdraw it from the nose, and an actuator rod extending axially from the body connecting at one end with said levers for operating the same.

3. A work holding chuck of the nature described, comprising a body member adapted to be secured upon the end of a machine tool spindle upon which the work is received and engaged against an annular shoulder formed on the body, and a plurality of work clamping levers pivoted within the body, each having an end bifurcated for receiving the work and providing opposing work engaging shoulders one for compressively forcing and holding the work against said annular shoulder and a second to move the work in a direction to withdraw it from the nose.

4. In a device of the class described, a hollow spindle rotatably mounted, a head upon the spindle having an axial bore, a circular work support and clamping face concentric with the spindle axis, radially disposed jaws pivoted to the head adapted to be brought toward and away from the outer face thereof, each jaw having its outer arm provided with abutments spaced apart between which a portion of the work is adapted to lie when seated upon said circular support, with the outer abutment engaged or engageable with the face of the work, said outer abutment further adapted when in full released position to be disposed within the peripheral plane of the work support, with the inner abutment engaging or engageable with the opposite side of the work, a piston slidable within said bore and splined within the head having spaced abutments respectively engaged at opposite sides of the inner ends of the jaws, and fluid operable means rotatable with the spindle and connected with said piston for reversely translating the piston and forcibly holding the same at limits of translation corresponding to clamping and released positions of the jaws.

5. In a device of the class described, a head rotatably mounted and having an axial bore, and a circular work support concentric with the bore, a plurality of radially disposed levers upon said head, each pivoted thereto intermediate its end, and each having a pair of abutments spaced apart and between which the inner peripheral portion of the work is adapted to lie when seated upon the circular support, one abutment adapted to engage the outer face of the work and draw the same in a direction axially of and against the work support, and further adapted during release movement to dispose the extremity of the lever and outer abutment within the peripheral plane of the work support, with the inner abutment engaging the work and translating the same, and fluid operable means rotatable with the head connected with said jaws for simultaneously and forcibly rocking the jaws and forcibly holding the same in clamping and release positions.

6. In combination with a tubular shaft rotatably mounted, a head at one end of the shaft having an axial bore and a circular work support concentric therewith, a plurality of radially disposed levers, each pivoted intermediate its end to said head, and each having at its outer end a pair of abutments, inner and outer, between which a portion of the work is adapted to lie when seated upon the circular support, in clamping or near-clamping position, one abutment adapted to engage the outer face of the work and draw the same in a direction axially of and clampingly against the work support, and further adapted during release movement to bring the outer extremity of the outer abutment to non-interfering position, within the peripheral plane of the work support, while the inner abutment engages and translates the work, a rod splined within the tubular shaft having abutments engaging at opposite sides of the inner ends of each lever, a compression cylinder attached to and rotatable with the tubular shaft having a piston attached to said rod, and means for introducing fluid pressure for alternately translating the piston, in opposite directions for simultaneously and forcibly rocking the jaws in reverse directions and forcibly holding the same in clamping and release positions.

7. In a device of the class described, a tubular shaft rotatably mounted, a work clamping head at one end of the shaft having a cylindrical work support for seating ring-like work concentric with the shaft axis, a plurality of radially disposed clamp levers pivoted intermediate their ends to the head, each lever having at its outer extremity a pair of abutments, inner and outer, and adapted to lie at opposite sides of the work when the same is seated in clamping or near-clamping position, upon the concentric support, the outer abutment of each lever adapted when moving inwardly or in clamping direction to pass beyond the periphery of the support, engage the outer face of the work, and draw toward and clamp the same against the head, and further adapted when moving outwardly or in release direction to obtain engagement of the inner abutment with the work and forcibly move the same away from the head, said outer abutment when in full released position disposed within the periphery of the work support, a rod splined within the tubular shaft connected with said levers for oscillating the same, a compression cylinder attached to the shaft having a piston head connected with the shaft, and means for introducing fluid under pressure alternately at opposite sides of the piston head while the spindle rotates for translating the piston head and rod in opposite directions and simultaneously forcibly rocking the elements in reverse directions and forcibly holding the same in clamping positions.

8. In a device of the class described, a tubular shaft rotatably mounted, a work clamping head fixed to the shaft having a work support concentric with the shaft axis upon and against which work is supported and clamped, a plurality of radially disposed levers pivoted intermediate their ends to the head, each lever having a head extending beyond the periphery of the work support and each outwardly extending end having a pair of terminal abutments adapted to lie at opposite sides of the work when the same is seated upon the support, the outer abutment of each lever, adapted when moving in clamping direction to pass beyond the periphery of the support, engage the outer face and force the same flatly against the head and further adapted when moving toward release position to bring the inner abutment into engagement with the back of the work, loosen and translate the same outwardly, said outer abutment when the lever is in full released position being disposed within the periphery of the support, and a fluid controlled device including a link connected with the levers for oscillating the same for clamping and releasing the work, said means adapted to be controlled from a distant point while the shaft is rotated.

9. A work holding and centering chuck of the nature described, comprising a body member adapted to be secured upon the end of a machine tool spindle providing a centering support upon which the work is slidably mounted and a clamping surface against which the work is abuttingly engaged, and a plurality of levers pivoted within the body, each lever having means for engagement with opposite sides of the work for alternately compressively forcing and clamping the work against said clamping surface of the body and for removing the work from the body.

In witness whereof, I hereunto subscribe my name.

FRANCIS B. COCKBURN.